United States Patent [19]

Adell

[11] Patent Number: 4,796,386

[45] Date of Patent: Jan. 10, 1989

[54] NON-METALLIC EDGE GUARD ATTACHMENT TO A DOOR

[75] Inventor: Robert Adell, Sunnyvale, Tex.

[73] Assignee: U. S. Product Development Company, Sunnyvale, Tex.

[21] Appl. No.: 66,858

[22] Filed: Jun. 25, 1987

[51] Int. Cl.⁴ ............................................... B60J 5/00
[52] U.S. Cl. ........................................ 49/462; 52/716
[58] Field of Search .................. 49/462; 52/716–718; 40/594, 595

[56] References Cited

U.S. PATENT DOCUMENTS

| 3,297,507 | 1/1967 | Twomey, Jr. | 40/595 X |
| 3,461,583 | 12/1966 | Buck | 40/595 |
| 3,641,707 | 2/1972 | Kellos | 49/462 |
| 3,687,502 | 8/1972 | Loew | 52/716 X |
| 4,296,155 | 10/1981 | Madonia et al. | 52/716 X |
| 4,546,022 | 10/1985 | Madonia et al. | 52/716 X |
| 4,555,870 | 12/1985 | McKinnon et al. | 49/462 |

Primary Examiner—Philip C. Kannan
Attorney, Agent, or Firm—Rhodes and Boller

[57] ABSTRACT

A plastic door edge guard comprises a base which is of reduced thickness from two legs with adhesive lining the interior and covered by a release layer which is selectively stripped to expose the adhesive at the time of installation of the edge guard on an edge of a swinging closure of an automobile.

17 Claims, 2 Drawing Sheets

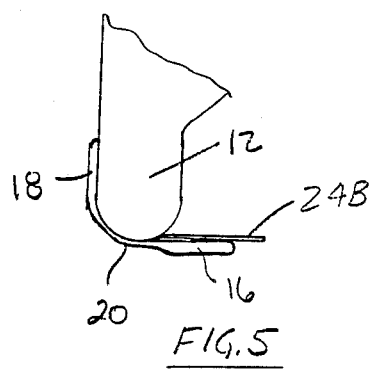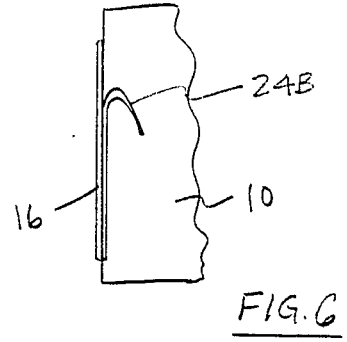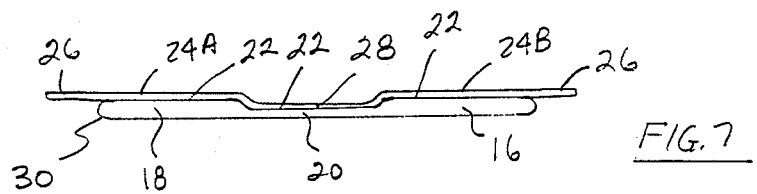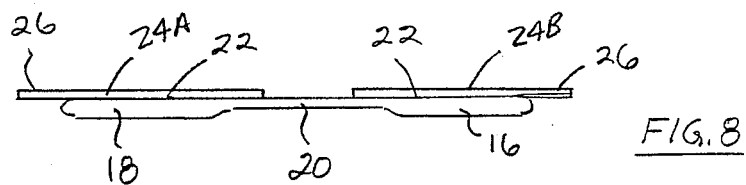

NON-METALLIC EDGE GUARD ATTACHMENT TO A DOOR

REFERENCE TO A RELATED APPLICATION

This application is related to the Applicant's pending Serial No. 004,658, filed January 20, 1987, "Non-Metallic Door Edge Guard".

BACKGROUND AND SUMMARY OF THE INVENTION

This mechanical invention relates generally to edge guards, and more particularly it relates to novel non-metallic edge guards, for use such as on the trailing edge of swinging closures, and their attachment to such swinging closures.

Edge guards are used as protective and decorative articles on the edges of objects. In the case of a swinging closure of an automotive vehicle such as an automobile door, an edge guard which is applied to the trailing edge of the swinging closure can provide not only decoration, but also protection when the trailing edge is swung against an object. The edge guard can provide protection not only for the trailing edge of the swinging closure, but also for an object which may be struck by the trailing edge of the swinging closure. That is not to say that an edge guard can protect and withstand substantial impacts, but edge guards are useful in preventing chipping, knicking, scratching and like damage which typically arises in regular everyday use of an automobile, for example the opening and closing of a car's doors in a confined space such as in a crowded parking lot.

Applicant is the inventor of many edge guard improvements over the years. These improvements are the subjects of many patents. For the most part, these patented improvements relate to metallic edge guards, or insulated metallic edge guards. Metal possesses superior decorative and functional characteristics, and the insulated metallic edge guards advantageously combine the benefits of metallic and non-metallic components.

Although Applicant continues to prefer the insulated metallic type of edge guard for automotive use because of the combination of benefits which it provides, he has discovered novel ways to improve upon non-metallic edge guards which can be useful for certain applications. Certain of these improvements in non-metallic edge guards are the subject of this patent application.

Non-metallic edge guards are not broadly new. Examples exist in prior patents such as U.S. Pat. Nos. 3,547,516 and 4,372,083. While these prior non-metallic edge guards claim to possess certain beneficial characteristics, the truth of the matter is that in practice they are difficult to install, especially on contoured edges, and once installed, they may not retain satisfactorily over the life of the automobile.

Briefly the edge guard in its preferred embodiment comprises a plastic body fabricated by conventional techniques, such as extrusion, so as to possess a certain ability to be conformed to the edge. The interior of the edge guard is covered by very tacky, rubbery adhesive, and the adhesive is in turn covered by a release layer. At time of installation the release layer is stripped from the interior of the edge guard to expose the adhesive. The preferred form of release layer comprises a score, or serration, which runs lengthwise of the edge guard along the base, dividing the release layer into two sections, one for one side of the edge guard's interior and the other for the other side. The stripping of the release layer is sequentially performed. First, one of the two sections is stripped, separating from the other along the score or serration. The adhesive on one side of the edge guard's interior is therefore exposed. The edge guard is in a spread apart condition at this time, and the exposed adhesive side is adhered to an underlying surface portion of the edge which is to be covered by the edge guard. Once such adherence has been obtained, either partially or completely along the length of the edge guard, the remainder of the release layer is stripped away, either partially or completely along the length of the edge guard, exposing adhesive on the remaining side of the edge guard's interior. Attachment is completed by reducing the extent to which the edge guard is spread apart, i.e. wrapping the base of the edge guard around the edge, and adhering the remaining side of the edge guard to the underlying surface of the edge. The result is a finished appearance with adhesion along substantially the whole interior of the edge guard.

The present invention offers significant advantages over other procedures and constructions as represented by the above referenced patents. The conformance problems of the edge guard of U.S. Pat. No. 3,547,515 are described in U.S. Pat. No. 4,372,083. Yet the edge guard of U.S. Pat. No. 4,372,083 proposes a solution which precludes the use of adhesive along the full extent of the interior of the edge guard; indeed the edge guard of U.S. Pat. No. 4,372,083 envisions the presence of adhesive only at the base of the edge guard's interior, and not substantially to distal ends of the legs. Moreover, the base of the edge guard of U.S. Pat. No. 4,372,083 is not of reduced thickness relative to the legs, and memory inherent in such a construction is relied upon to prevent the distal ends of the legs from separating from the sides of the door edge because there is no adhesive present along the distal ends of the legs. It is believed that such a design would ultimately result in separation, and in any event the actual use would surely result in separation over time, and probably not a long time at that where environmental conditions are severe. Still further, the need to have a significant thickness at the base, and along the legs as well, requires a corresponding amount of material and this adds to the cost and to the potential for interference with an adjacent door pillar or rear door when the door which contains the edge guard is closed.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 5 is a view similar to FIG. 1 useful in explaining the procedure for installing the edge guard on the door edge.

FIG. 6 is another view of the installation procedure.

FIG. 7 is a view similar to FIG. 4, but of an alternate embodiment.

FIG. 8 is a view similar to FIG. 4, but of another alternate embodiment.

DESCRIPTION OF THE PREFERRED EMBODIMENT

Figure 1:
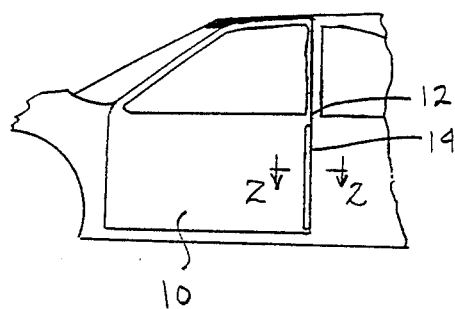
FIG. 1 is a partial side elevational view of an automobile door containing a door edge guard according to principles of the invention.
Figure 2:
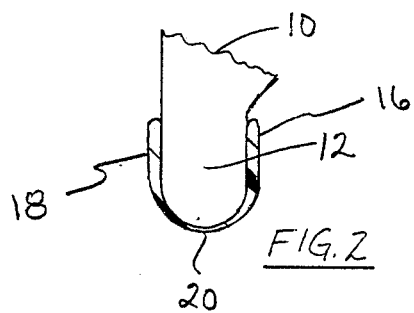
FIG. 2 is a transverse cross sectional view, on an enlarged scale, in the direction of arrows 2—2 in FIG. 1.

FIGS. 1 and 2 show an automobile door 10 on whose trailing edge 12 is installed a door edge guard 14 in accordance with principles of the invention. The illustrated edge guard is an extruded plastic such as PVC. When installed as shown, it comprises a general U-shape in transverse cross section having inner and outer legs 16, 18 disposed against opposite sides of the door edge and a curved base 20 which wraps around the end of the edge.

Figure 3:
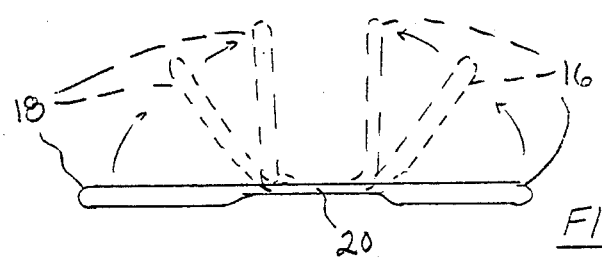
FIG. 3 is a view in the same direction as FIG. 2, but of the edge guard alone, useful in explaining the invention.

In accordance with principles of the invention, the edge guard per se is endowed with the ability to be spread more or less open over a range of varying angulations of the two legs 16, 18 relative to each other as representatively portrayed in FIG. 3. Representative shapes are L, V, C, and U shapes. This ability is attained by reducing the thickness of base 20 relative to the thickness of legs 16, 18. Although the invention may be embodied in edge guards of various sizes, shapes and dimensions, the legs, for purposes of illustration, could be 0.060 inch thick and the thickness of base 20 could be 0.025 inch or even less.

In accordance with further principles of the invention, the inner surface of the edge guard contains an adhesive 22 for attaching the plastic edge guard to the painted metal door edge. The adhesive 22 is applied to the edge guard during the process of fabricating the edge guard. It covers substantially the entire inner surface in the embodiment of FIG. 1 including the base, and the two legs substantially to the distal ends of the legs. The particular adhesive used may depend to a certain extent upon the particular plastic material of the edge guard and the surface material of the edge onto which the edge guard is installed; however, a rubbery-like, very tacky, epoxy cement is preferred. Contact, or acrylic, cement for example. The material catalytically welds to the plastic material of the edge guard, yet remains tacky and rubbery for a substantial time after fabrication for excellent contact adhesion on an edge. Because of the nature of the adhesive, it must be covered by a release layer 24 prior to installation.

Figure 4:
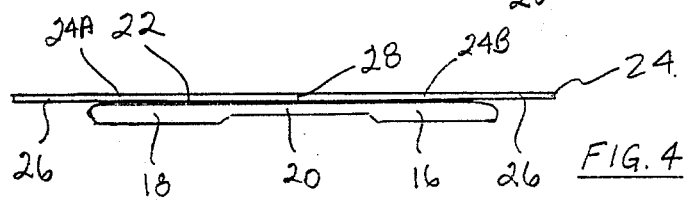
FIG. 4 is a view similar to FIG. 3 illustrating further detail.

Such a release layer is shown in FIG. 4 where it covers the adhesive and preferably extends beyond the ends of the edge guard legs to leave margins 26 via which stripping of the release layer away from the adhesive may be facilitated. The release layer contains a surface which adheres only slightly to the adhesive so as to stay in covering relationship to the adhesive prior to installation, yet pull away from the adhesive without excessive force to expose the adhesive at time of installation. A wax paper or siliconized surface for the layer is suitable. Where the edge guard tends to assume a U-shape as manufactured, the U-shape will tend to aid in keeping the release paper on the adhesive prior to installation, but will not significantly impair stripping of the release paper from the edge guard at time of installation.

The release layer constitutes a further aspect of the invention. The illustrated release layer 24 contains a serration or score line 28 which runs lengthwise of the edge guard at the center of the base so that the layer consists of two sections 24A, 24B bounding the serration. The procedure for installing the edge guard is to remove only one half of the release layer, i.e. one section, at the beginning of installation. This is done by gripping one of the margins 26 at one lengthwise end of the edge guard and pulling the release layer generally lengthwise of the edge guard, much as in the manner of pulling a tear cord. FIGS. 5 and 6 show a stage of a representative installation procedure. Depending upon the particular nature of a given installation, the entire half may be pulled away along the full length, or it may be pulled only partially along the length. As the one half of the release layer is being stripped away, it separates from the other half along the serration line, and the other half remains in place. The exposed adhesive on one half of the interior surface can now adhere to the edge when that half is applied to the edge in the manner of FIG. 5. At this time the edge guard is spread apart more than the amount which it will be when fully installed. After having adhered the one half of the edge guard as represented by FIG. 5, the release layer still covering the other half is then stripped (FIG. 6). The base of the edge guard is fully wrapped around the end of the edge and the remainder of the interior surface adhered to the adjacent side of the edge thereby resulting in the fully installed condition portrayed in FIG. 2.

Any particular procedure for installing the edge guard will depend on various factors such as the size and shape of the edge guard and the edge. For example, the entire half of the release layer may be stripped away, and that entire half adhered to the side of the edge before any of the remainder of the release layer is stripped away. Alternatively, the installation may comprise a partial lengthwise stripping of one half, followed by a partial lengthwise stripping of the other half, and the resulting adherence of both sides of the edge guard, as a series of successive steps along the edge guard's length. The serration concept greatly facilitates installation, especially by a single person. However, certain principles of the invention are not dependent upon having a serration as indicated, but lack of a serration, or equivalent, may involve the use of two people to make an installation.

FIG. 7 shows another embodiment 30 wherein the manner in which the thickness of the base is reduced is different from that shown in the preceding embodiment.

FIG. 8 shows yet another embodiment where the equivalent of a serration is produced by having the release layer 24 as two separate pieces 24A, 24B each covering one side of the edge guard. This embodiment also shows the two pieces 24A, 24B spaced apart at the base with a portion of the base free of adhesive, because in some embodiments it may be desirable to omit adhesive from certain regions such as the central region of the base where the edge guard wraps around the end of the edge. Where the adhesive does fully cover the base, the release layer may still embody two separate pieces placed edge-to-edge along the central region of the base.

Although the embodiments described so far are symmetrical about the base, such symmetry is not essential to certain generic principles of the invention. A release layer having a serration need not necessarily have the serration at the center of the base, but rather the serration, or equivalent, could be to one side. Likewise there could be plural serrations, or equivalents.

The process for fabricating the edge guard is preferably extrusion of the plastic, the application of adhesive to the extruded plastic, and the covering of adhesive with release layer. This can be done on a continuous basis as the plastic is extruded, and the resulting product either coiled into rolls or cut to individual lengths. The product can be extruded in the flat and conformed to edge guard shape later, such as at time of installation. Or the product can be conformed to general edge guard shape during the fabrication process.

Full adherence of the entire interior of the edge guard is the edge makes separation less likely and protects from intrusion of foreign matter such as water between the edge guard and the edge. The edge guard also has the ability to conform to irregular edges. It can accommodate a range of covering spanning from about 15 to 20 degrees from the 12 o'clock position to about 340 to 345 degrees, as measured about the centerpoint of the radius of curvature of the base in the installed edge guard. Various decorative enhancements may be imparted to the edge guard, such as disclosed in may pending applications on Non-metallic Door Edge Guards. These include mylar encapsulated foils, and inclusion of ribbing for decorative and stiffeling purposes.

While a preferred embodiment of the invention has been disclosed, it will be appreciated that principles may be applied to other embodiments.

What is claimed is:

1. In combination with the trailing edge of a swinging door, a plastic door edge guard comprising a shaped cross section having inner and outer legs which extend from a base and fitting onto the trailing edge of the swinging door, said base comprising a character which enables the edge guard to be spread more or less apart so as to be open for fitting onto the trailing edge of the swinging door and assuming an installed condition wherein the sides of the legs are disposed against opposite sides of said trailing edge, said plastic door edge guard comprising an improved means for installing and attaching the edge guard to the trailing edge which comprises an adhesive material lining the interior of the edge guard from the base substantially to the distal ends of the legs, and a release layer covering said adhesive material prior to installation so that the adhesive material is not exposed, said release layer comprising separately releasable sections which are sequentially stripped from the edge guard during the installation process, one of said sections covering one leg and being the first stripped away to expose the adhesive material of that one leg while another section remains covering the other leg, the edge guard being somewhat spread open during installation such that the leg on which the adhesive material has been exposed can be adhered to one side of the door edge and then the other section of release layer stripped away to expose the adhesive material on the other leg, and the spread of the edge guard is then reduced by wrapping the base around and against the end of the trailing edge and by adhering the other leg to the other side of the trailing edge, said base having a reduced thickness from the thicknesses of said legs to facilitate conformance of the base to wrapping around the end of the trailing edge.

2. An improved means as set forth in claim 1 in which said separately releasable sections of said release layer are joined together by a line of serration along which the separately releasably sections are severed from each other when sequentially stripped from the edge guard.

3. An improved means as set forth in claim 2 in which said line of serration runs lengthwise of the edge guard along a central region of the base.

4. An improved means as set forth in claim 3 in which the entire release layer comprises two such sections, one for one side of the interior of the edge guard and the other for the other side.

5. An improved means as set forth in claim 1 in which said two sections of the release layer cover opposite sides of the edge guard and are separated from each other in spaced apart relation along the base, the portion of the base between the two sections being free of adhesive.

6. In combination with the trailing edge of a swinging door, a plastic door edge guard comprising a shaped cross section having inner and outer legs which extend from a base and fitting onto the trailing edge of the swinging door, said base comprising a character which enables the edge guard to be spread more or less apart so as to be open for fitting onto the trailing edge of the swinging door and assuming an installed condition wherein the sides of the legs are disposed against opposite sides of said trailing edge, said plastic door edge guard comprising an improved means for installing and attaching the edge guard to the trailing edge which comprises an adhesive material lining the interior of the edge guard from the base substantially to the distal ends of the legs, and a release layer covering said adhesive material prior to installation so that the adhesive material is not exposed, said release layer comprising means for being selectively stripped from the edge guard during the installation process to first expose the adhesive material of one leg while still covering the other leg, the edge guard being somewhat spread open during installation such that the leg on which the adhesive material has been exposed can be adhered to one side of the door edge, and for then being further stripped away from the edge guard to expose the adhesive material on the other leg, and the spread of the edge guard is then reduced by wrapping the base around and against the end of the trailing edge and by adhering the other leg to the other side of the trailing edge, said base having a reduced thickness from the thicknesses of said legs to facilitate conformance of the base to wrapping around the end of the trailing edge.

7. An improved means as set forth in claim 6 in which said release layer comprises plural separately releasable sections, one of said sections covering one leg and the other the other leg.

8. An improved means as set forth in claim 7 in which said one and other of said sections are spaced apart from each other to leave a central region of the interior of the base uncovered and free of adhesive.

9. An improved means as set forth in claim 7 in which said one and other of said sections are joined together along a line of serration extending lengthwise of the edge guard.

10. In combination with the trailing edge of a swinging door, a plastic door edge guard comprising a shaped cross section having inner and outer legs which extend from a base and fitting onto the trailing edge of the swinging door, said base comprising a character which enables the edge guard to be spread more or less apart so as to be open for fitting onto the trailing edge of the swinging door and assuming an installed condition wherein the sides of the legs are disposed against opposite sides of said trailing edge, said plastic door edge guard comprising an improved means for installing and attaching the edge guard to the trailing edge which comprises an adhesive material lining the interior of the edge guard from the base substantially to the distal ends of the legs, and a release layer covering said adhesive material prior to installation so that the adhesive material is not exposed, said release layer comprising separately releasable sections which are sequentially stripped from the edge guard during the installation process, one of said sections covering one leg and being the first stripped away to expose the adhesive material of that one leg while another section remains covering the other leg, the edge guard being somewhat spread open during installation such that the leg on which the adhesive material has been exposed can be adhered to one side of the door edge and then the other section of release layer stripped away to expose the adhesive material on the other leg, and the spread of the edge guard is then reduced by wrapping the base around the end of the trailing edge and by adhering the other leg to the other side of the trailing edge, and wherein the free condition of the edge guard, as manufactured, is essentially flat so that the base and legs are essentially co-planar and said release layer is also essentially flat and planar in the free, as manufactured, condition.

11. The improved means set forth in claim 10 in which said base has a reduced thickness from the thicknesses of the legs.

12. The improved means set forth in claim 11 in which the reduced thickness of the base is toward the exterior of the installed edge guard.

13. In combination with the trailing edge of a swinging door, a plastic door edge guard comprising a shaped cross section having inner and outer legs which extend from a base and fitting onto the trailing edge of the swinging door, said base comprising a character which enables the edge guard to be spread more or less apart so as to be open for fitting onto the trailing edge of the swinging door and assuming an installed condition wherein the sides of the legs are disposed against opposite sides of said trailing edge, said plastic door edge guard comprising an improved means for installing and attaching the edge guard to the trailing edge which comprises an adhesive material lining the interior of the edge guard from the base substantially to the distal ends of the legs, and a release layer covering said adhesive material prior to installation so that the adhesive material is not exposed, said release layer comprising means for being selectively stripped from the edge guard during the installation process to first expose the adhesive material of one leg while still covering the other leg, the edge guard being somewhat spread open during installation such that the leg on which the adhesive material has been exposed can be adhered to one side of the door edge, and for then being further stripped away to expose the adhesive material on the other leg, and the spread of the edge guard is then reduced by wrapping the base around the end of the trailing edge and by adhering the other leg to the other side of the trailing edge, and wherein the free condition of the edge guard, as manufactured, is essentially flat so that the base and legs are essentially co-planar and said release layer is also essentially flat and planar, in the free, as manufactured, condition.

14. The improved means set forth in claim 13 in which said base has a reduced thickness from the thicknesses of 15. The improved means set forth in claim 14 in which the reduced thickness of the base is toward the exterior of the installed edge guard.

16. In combination with the trailing edge of a swinging door, a plastic door edge guard comprising a shaped cross section having inner and outer legs which extend from a base and fitting onto the trailing edge of the swinging door, said base comprising a character which enables the edge guard to be spread more or less apart so as to be open for fitting onto the trailing edge of the swinging door and assuming an installed condition wherein the sides of the legs are disposed against opposite sides of said trailing edge, said plastic door edge guard comprising an improved means for installing and attaching the edge guard to the trailing edge which comprises an adhesive material lining the interior of the edge guard from the base substantially to the distal ends of the legs, and a release layer covering said adhesive material prior to installation so that the adhesive material is not exposed, said release layer being stripped from the edge guard during the installation process to expose the adhesive material, the edge guard being somewhat spread open during installation such that one leg can be first adhered to one side of the door edge and then the spread of the edge guard reduced by wrapping the base around the end of the trailing edge and by adhering the other leg to the other side of the trailing edge, said edge guard comprising said base having a reduced thickness from the thicknesses of the legs, and the reduced thickness of the base being toward the exterior of the installed edge guard.

17. For fitting onto the trailing edge of a swinging door, a plastic door edge guard comprising a shaped cross section having inner and outer legs which extend from a base and fitting onto the trailing edge of the swinging door, said base comprising a character which enables the edge guard to be spread more or less apart so as to be open for fitting onto the trailing edge of the swinging door and assuming an installed condition wherein the sides of the legs are disposed against opposite sides of said trailing edge, said plastic door edge guard comprising an improved means for installing and attaching the edge guard to the trailing edge which comprises an adhesive material lining the interior of the edge guard from the base substantially to the distal ends of the legs, and a release layer covering said adhesive material prior to installation so that the adhesive material is not exposed, said release layer comprising separately releasable sections which are sequentially stripped from the edge guard during the installation process, one of said sections covering one leg and being the first stripped away to expose the adhesive material of that one leg while another section remains covering the other leg, the edge guard being somewhat spread open during installation such that the leg on which the adhesive material has been exposed can be adhered to one side of the door edge and then the other section of release layer stripped away to expose the adhesive material on the other leg, and the spread of the edge guard is then reduced by wrapping the base around the end of the trailing edge and by adhering the other leg to the other side of the trailing edge, said base having a reduced thickness from the thicknesses of said legs to facilitate conformance of the base to wrapping around the end of the trailing edge and wherein the free condition of the edge guard, as manufactured, is essentially flat so that the base and legs are essentially co-planar and said release layer is also essentially flat and planar in the free, as manufactured, condition.

* * * * *